United States Patent
Ito

(10) Patent No.: US 10,951,148 B2
(45) Date of Patent: Mar. 16, 2021

(54) CONTROL APPARATUS OF A SYNCHRONOUS MOTOR

(71) Applicant: TOSHIBA MITSUBISHI-ELECTRIC INDUSTRIAL SYSTEMS CORPORATION, Chuo-ku (JP)

(72) Inventor: Takumi Ito, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 16/517,713

(22) Filed: Jul. 22, 2019

(65) Prior Publication Data

US 2019/0341865 A1 Nov. 7, 2019

Related U.S. Application Data

(63) Continuation of application No. PCT/JP2017/002155, filed on Jan. 23, 2017.

(51) Int. Cl.
*H02P 21/10* (2016.01)
*H02P 21/18* (2016.01)
(Continued)

(52) U.S. Cl.
CPC .............. *H02P 21/10* (2013.01); *H02P 21/18* (2016.02); *H02P 21/34* (2016.02); *H02P 27/12* (2013.01)

(58) Field of Classification Search
CPC ........ H02P 6/18; H02P 27/12; H02P 2207/05; H02P 21/18; H02P 21/34; H02P 21/10
See application file for complete search history.

(56) References Cited

U.S. PATENT DOCUMENTS 5,144,564 A * 9/1992 Naidu ................. H02P 6/18
 318/721
5,729,102 A * 3/1998 Gotou ............... G11B 19/2009
 318/400.13

(Continued)

FOREIGN PATENT DOCUMENTS

JP 63-27959 B2 6/1988
JP 2001-295769 10/2001
(Continued)

OTHER PUBLICATIONS

International Search Report dated Apr. 25, 2017 in PCT/JP2017/002155, filed on Jan. 23, 2017.
(Continued)

*Primary Examiner* — Rina I Duda
(74) *Attorney, Agent, or Firm* — Oblon, McClelland, Maier & Neustadt, L.L.P.

(57) ABSTRACT

A control apparatus of a synchronous motor with a load commutated inverter includes a positive/negative judgment unit for discriminating positive/negative of the motor voltage of each phase of the three-phase AC input of the synchronous motor, an estimated phase setting unit for calculating and setting the estimated phase of the motor voltage based on the discrimination result by the positive/negative discrimination unit, and a speed estimation unit for estimating the speed of the synchronous motor by integrating the change of the estimated phase by a predetermined number of times and dividing the integrated result by the product of the predetermined number and the operation cycle. When driving the synchronous motor with the load commutated inverter, in a condition the synchronous motor slips at high speed, restart is made easier.

4 Claims, 5 Drawing Sheets

(51) Int. Cl.
*H02P 21/34* (2016.01)
*H02P 27/12* (2006.01)

(56) References Cited

U.S. PATENT DOCUMENTS

| | | | | | |
|---|---|---|---|---|---|
| 6,121,736 | A | * | 9/2000 | Narazaki | H02P 6/182 |
| | | | | | 318/400.02 |
| 7,211,984 | B2 | * | 5/2007 | Patel | F02N 11/04 |
| | | | | | 318/700 |
| 7,279,865 | B2 | * | 10/2007 | Matsuo | H02P 21/18 |
| | | | | | 318/767 |
| 2011/0028533 | A1 | | 2/2011 | Nir et al. | |
| 2011/0285337 | A1 | * | 11/2011 | Taniguchi | H02P 21/24 |
| | | | | | 318/400.34 |

FOREIGN PATENT DOCUMENTS

| | | |
|---|---|---|
| JP | 2007-6676 | 1/2007 |
| JP | 4279886 B2 | 9/2008 |
| JP | 2012-196002 | 10/2012 |
| JP | 2012-196002 A | 10/2012 |
| JP | 2015-149875 | 8/2015 |
| WO | 2011/152558 A1 | 12/2011 |

OTHER PUBLICATIONS

Office Action dated Dec. 18, 2020, in Indian Patent Application No. 201917028167, English only.

* cited by examiner

CONTROL APPARATUS OF A SYNCHRONOUS MOTOR

CROSS-REFERENCE TO RELATED APPLICATION

This application is based upon and claims the benefit of priority from the prior PCT Patent Application No. PCT/JP2017/02155, filed on Jan. 23, 2017, the entire contents of which are incorporated herein by reference.

TECHNICAL FIELD

The embodiment of the present invention relates to a control apparatus of a synchronous motor having a motor speed estimation function.

BACKGROUND ART

Hereinafter, description will be made with reference to FIG. 1. Consider a case where a synchronous motor is driven without sensor by a load commutated inverter (LCI). There have been a method of detecting a motor terminal voltage of a synchronous motor, which synchronize the phase of the detected motor voltage using a phase locked circuit, that is PLL (Phase Locked Loop), and calculates the phase of the synchronous motor and a frequency of the terminal voltage (Hereinafter referred to as a motor PLL). If this frequency can be detected, the speed of the synchronous motor is also uniquely determined.

Therefore, the motor speed of the synchronous motor can be controlled by performing firing phase control on the rectifier side based on the frequency calculated by the motor PLL and performing firing phase control on the inverter side based on the phase calculated by the motor PLL. The motor PLL converts the motor voltage of the 3-phase synchronous motor into two axes of D-axis and Q-axis (hereinafter referred to as DQ conversion), and performs proportional integral control (hereinafter call PI control) by operating the motor phase so that the output of the Q-axis follows zero. When the Q-axis output is zero, the integral term of PI control corresponds to the frequency of the induced m motor voltage. Since the relationship between the frequency and the synchronous motor is uniquely determined, the value of this frequency corresponds to the speed of the synchronous motor. When PI control can be calculated from low speed, the integral term is calculated from near zero, so that the frequency can be continuously tracked from low speed to high speed area. (See, for example, Patent Document 1).

PRIOR ART DOCUMENT

Patent Document

Patent Document 1: Japanese Patent Application Publication No. 2015-149875

SUMMARY OF THE INVENTION

Problem to be Solved by the Invention

However, when the field current is not flowing and the induced motor voltage of the synchronous motor is small or when the synchronous motor rotating at high speed is restarted, it is necessary to follow the frequency of the induced voltage of the synchronous motor with the initial integration term being zero. In this case, the integral term of PI control cannot follow the rotating Q-axis, making it difficult to stabilize the motor PLL, which may make it difficult to restart the synchronous motor.

The present invention is made to solve the above-mentioned problems, and an object of the present invention is to provide a control apparatus of a synchronous motor which can estimate motor speed at any speed from low speed to high speed area, and can restart the motor, when driving a synchronous motor with a load commutated inverter.

Means for Solving the Problem

In order to achieve the above object, a control apparatus of a synchronous motor with a load commutated inverter includes, a positive/negative judgment means for discriminating positive/negative of induced voltage of each phase of three-phase AC input of the synchronous motor, an estimated phase setting means for calculating and setting the estimated phase of the induced voltage based on the judgment result by the positive/negative judgment means, and a motor speed estimation means for estimating the speed of the synchronous motor by integrating the change of the estimated phase by a predetermined number of times, and dividing an integrated result by the product of the predetermined number and the operation cycle.

Effects of the Invention

According to the present invention, it is possible to provide a control apparatus of a synchronous motor which can estimate the motor speed at any speed from the low speed to the high speed region, and it can restart the motor.

EMBODIMENT TO PRACTICE THE INVENTION

Hereinafter, embodiment of the present invention will be described with reference to the drawings.

Embodiment 1

Figure 1:
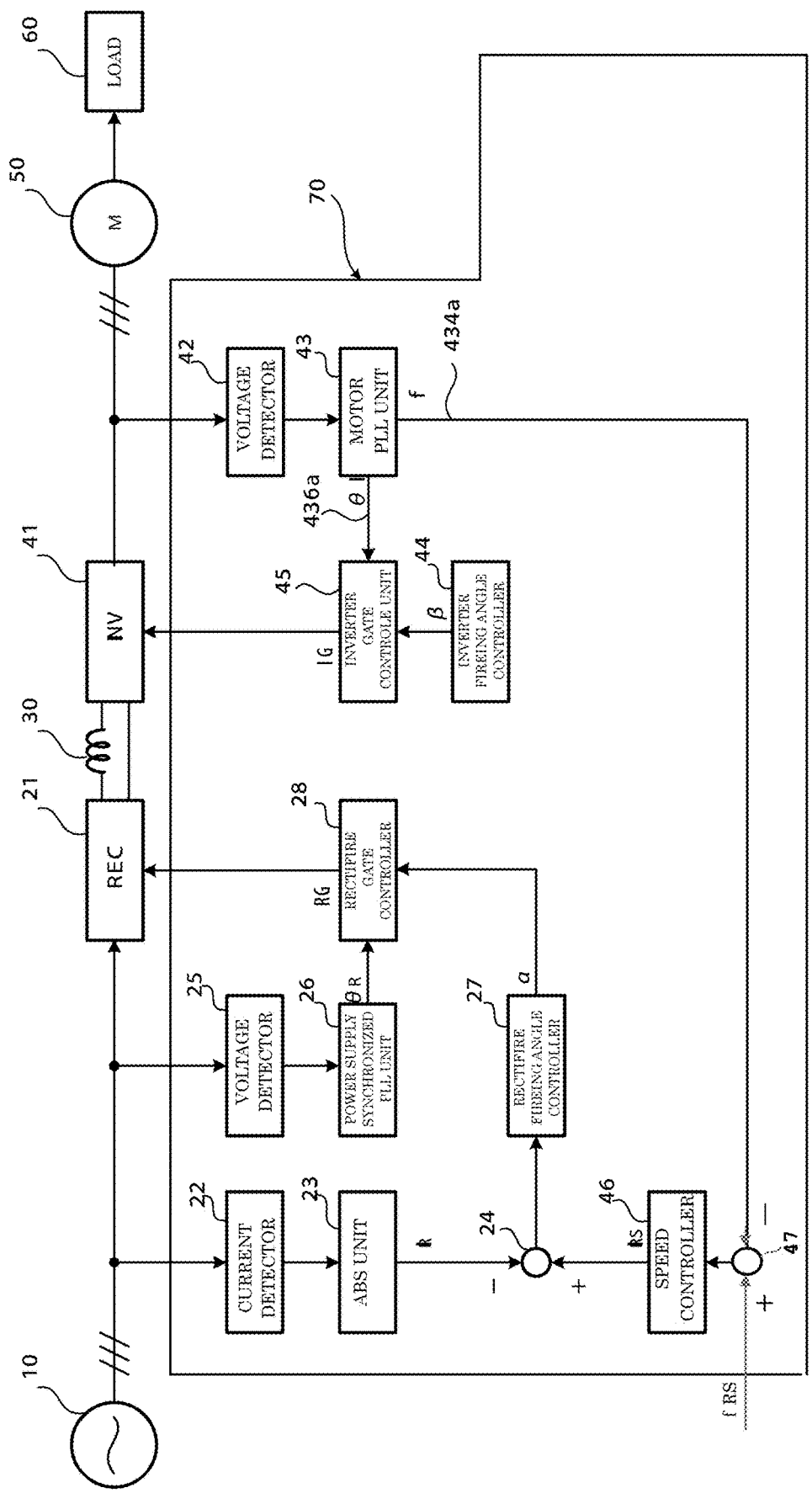
FIG. 1 A block diagram showing a configuration of a control apparatus of a synchronous motor provided with a speed estimation function according to a first embodiment.

FIG. 1 is a block diagram showing a configuration of a control apparatus 1 of a synchronous motor (hereinafter referred to as a motor) 50 provided with a speed estimation function according to the first embodiment. The control apparatus 1 is configured to include a rectifier 21, a direct current reactor 30, an inverter 41, a control circuit unit 70.

A rectifier 21 converts AC power outputted from the AC power supply 10 into DC power. An illustrated AC power supply 10 is configured of a three-phase AC power supply and outputs three-phase AC power. A rectifier 21 is configured of, for example, a three-phase thyristor bridge or the like. An inverter 41 receives DC power outputted from the rectifier 21 via a DC reactor 30, converts the DC power into three-phase AC power, and outputs an AC power. The outputted three-phase AC power is inputted to the motor 50 to drive the motor 50. The motor 50 drives a load 60 connected to its rotating shaft. The DC reactor 30 smoothes the ripples of the direct current. The inverter 41 is a load commutated inverter, and is formed of, for example, a three-phase thyristor bridge.

The control circuit unit 70 includes a current detector 22, an ABS unit 23, an adder/subtractor 24, a voltage detector 25, a power supply synchronous PLL unit 26, a rectifier firing angle controller 27, a rectifier gate controller 28, a voltage detector 42, a motor PLL unit 43, an inverter firing angle controller 44, an inverter gate controller 45, a speed controller 46, a comparator 47.

The current detector 22 detects the current inputted from the AC power supply 10 to the rectifier 21 and inputs the detected current value to the ABS unit 23 connected to the output of the current detector 22. The ABS unit 23 calculates the absolute value of the current value inputted from the current detector 22 and outputs it as a current feedback value IR. The output current feedback value IR is inputted to the adder/subtractor 24 connected to the ABS unit 23.

An adder/subtractor 24 calculates a deviation current value of the current reference value IRS inputted from the speed controller 46 and the current feedback value IR inputted from the ABS unit 23, and the calculated deviation current value is inputted to the rectifier firing angle controller 27 connected to the output of the adder/subtractor 24. The rectifier firing angle controller 27 calculates the firing angle α (hereinafter referred to as a rectifier firing angle α) of the rectifier 21 based on the deviation current value inputted from the adder/subtractor 24, and inputs it to the rectifier gate controller 28 connected to the output of the rectifier firing angle controller 27. The voltage detector 25 is connected to the AC power supply 10, detects an AC power supply voltage inputted to the rectifier 21, and inputs the detected voltage value to the power supply synchronized PLL unit 26.

AC power supply voltage phase θR and the rectifier firing angle α are inputted to the rectifier gate controller 28. The AC power supply voltage phase θR is an output from the power supply synchronized PLL unit 26 based on the phase of the AC power supply 10 outputted from the voltage detector 25, and the rectifier firing angle α is an output from the rectifier firing angle controller 27. The rectifier gate controller 28 generates a rectifier gate pulse RG for switching semiconductor elements (not shown) constituting the rectifier 21 on the basis of the rectifier firing angle α synchronized with the input AC power supply voltage phase θR, and outputs it to the rectifier 21. The rectifier 21 performs switching of the rectifier 21 with the rectifier gate pulse RG inputted from the rectifier gate control unit 28.

The inverter firing angle controller 44 calculates the inverter firing angle β based on a voltage detection signal (not shown) from the voltage detector 42, a frequency signal (not shown) from the motor PLL unit 43, a current feedback value IR (not shown) from the ABS unit 23, or the output current of the inverter 41 (not shown), etc. The inverter firing angle β, for example, performs such that the constant margin angle control (γ constant control) of the inverter 41. The calculated inverter firing angle β is inputted to the inverter gate controller 45.

A voltage detector 42 detects a motor terminal voltage of the motor 50 connected to the inverter 41, and inputs the detected motor voltage to the motor PLL unit 43. The motor PLL unit 43 outputs the motor phase θI synchronized with the phase of the motor voltage and the frequency f of the motor voltage. The frequency f of the motor voltage indicates the rotational speed of the motor and is uniquely determined. Therefore, the frequency f of the motor voltage may be hereinafter referred to as the motor speed f. The motor phase θI is inputted to the inverter gate controller 45 connected to the output of the motor PLL unit 43, and the motor speed f is inputted to the adder/subtractor 47 connected to the output of the motor PLL unit 43.

The adder/subtractor 47 calculates the deviation between the speed reference value fRS inputted from the upper apparatus (not shown) and the motor speed f inputted from the motor PLL unit 43, and inputs the calculated deviation velocity value to the speed controller 46 connected to the output of the adder/subtractor 47. The inverter gate controller 45 receives the inverter firing angle β from the inverter firing angle controller 44 and the motor phase θI from the motor PLL unit 43. The inverter gate controller 44 outputs, to the inverter 41, an inverter gate pulse IG for switching semiconductor elements (not shown) constituting the inverter 41 based on the inverter firing angle β synchronized with the input motor phase θI. The inverter 41 performs switching of the inverter 41 with the inverter gate pulse IG inputted from the inverter gate controller 45. The inverter 41 is controlled based on the inverter gate pulse IG inputted from the inverter gate controller 45, and outputs three-phase AC power.

Figure 2:
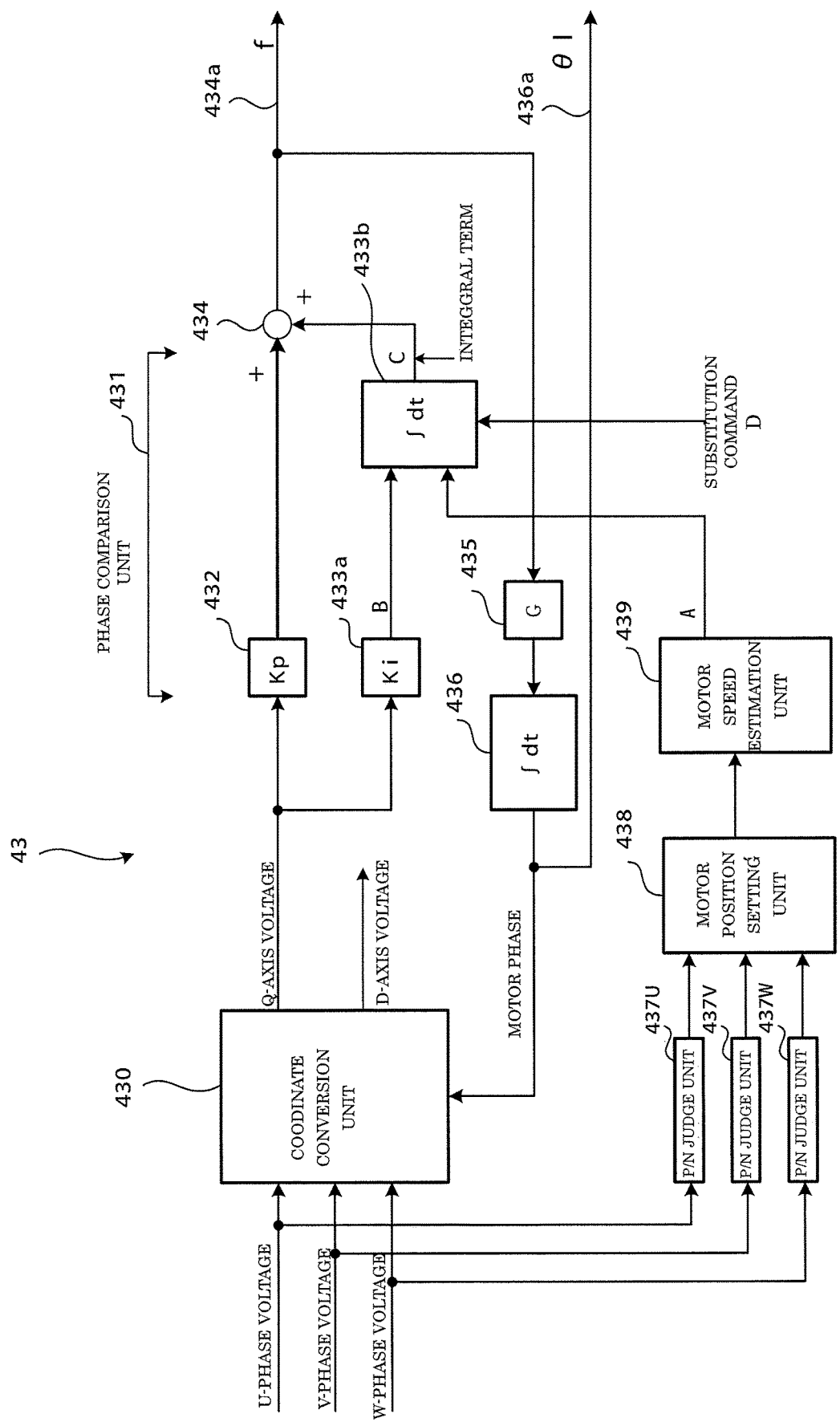
FIG. 2 A block diagram showing the configuration of a motor PLL unit shown in FIG. 1.

FIG. 2 is a block diagram showing a configuration of motor PLL unit 43 shown in FIG. 1. The motor PLL unit 43 includes a coordinate conversion unit 430, a phase comparison unit 431, a positive/negative judgment unit 437 (collectively referred to as 437U, 437V and 437W), a motor position setting unit 438, a motor speed estimation unit 439.

The motor voltage of the motor 50 is detected by the voltage detector 42 and is inputted to the coordinate conversion unit 430. The coordinate conversion unit 430 converts three-axis coordinates composed of three-phase AC voltages (U-phase voltage, V-phase voltage and W-phase voltage) into two-axis coordinates (D-axis, Q-axis so-called DQ conversion) and outputs them. By performing such conversion, control of the follow-up to the frequency of the motor voltage, which is a requirement for PLL control in the motor PLL unit 43 becomes easy, since it can be confirmed by monitoring the Q-axis voltage. The phase comparison unit 431 includes a proportional unit 432, a proportional unit 433a, an integrator 433b, an adder 434, and performs PI control so that the Q-axis voltage outputted from the coordinate conversion unit 430 becomes zero. Note that Kp and Ki are proportional factors, respectively. The main parts will be described below.

The coordinate conversion unit 430 performs the above-described DQ conversion and outputs a Q-axis voltage. The output Q-axis voltage is inputted to the proportional unit 432 and the proportional unit 433a of the phase comparison unit 431 connected to the output of the coordinate conversion unit 430. The proportional unit 432 inputs the value generated by multiplying the Q-axis voltage outputted from the coordinate conversion unit 430 by the proportionality factor Kp to the adder 434. Similarly, the proportional unit 433a inputs the value B generated by multiplying the Q-axis voltage outputted from the coordinate conversion unit 430 by the proportionality coefficient Ki to the integrator 433b.

In the normal case where the substitution command D is not inputted, the integrator 433b integrates the value B outputted from the proportional unit 433a and inputs the output signal C to the adder 434. The adder 434 adds the output of the proportional unit 432 and the output C of the integrator 433b. The value obtained as a result of the addition (this value corresponds to the frequency of the motor voltage but is uniquely associated with the rotational speed of the motor, so this is referred to as the motor speed f) is inputted to the proportional unit 435. The proportional unit 435 inputs the voltage generated by multiplying the motor speed f output from the adder 434 by the proportionality factor G to the integrator 436. The integrator 436 integrates the voltage output from the proportional unit 435, and inputs the integrated value to the coordinate conversion unit 430 connected to the output of the integrator 436. The integrator 436 converts the motor speed f described above into the motor phase θI and feeds it back to the coordinate conversion unit 430 to form a feedback loop.

Further, the output of the integrator 436 is configured to reset the integrated value to 0 at the timing when the motor phase becomes 360°. The motor PLL operation is performed through the above-described series of operations, and the output of the integrator 436 indicates the motor phase θI (see the motor PLL unit 43 in FIG. 1). The feedback gain is changed by changing the value of the proportional coefficient G described above, and the relationship between the motor speed f and the motor phase θI is set to match depending on the frequency to be handled and the number of motor poles. The proportional coefficient Kp or the proportional coefficient Ki is a coefficient for setting the followability of the motor speed f, and the response time of the motor speed f is changed by changing the coefficient.

In the configuration described above, the motor PLL unit 43 performs DQ conversion on motor voltages for three phases, and performs PI control of the motor phase θI so that the Q axis voltage follows zero. When the Q-axis output becomes zero, the output C of the PI control integrator 433b is equal to the motor speed f (see motor PLL unit 43 in FIG. 1). When PI control is possible from low speed, the integral term in the integrator 433b is calculated from near zero, so that speed estimation can be continuously performed from low speed to high speed region.

Next, the motor speed estimation unit that is the subject matter of the present invention will be described. The motor voltage of the motor 50 is detected by the voltage detector 42 and is inputted to the coordinate conversion unit 430, and the U-phase voltage is inputted to the positive/negative judgment unit 437U, the V-phase voltage is inputted to the positive/negative judgment unit 437V, the W-phase voltage is inputted to the positive/negative judgment unit 437W, respectively. The positive/negative judgment units 437U, 437V and 437W determine whether the U-phase voltage, the V-phase voltage and the W-phase voltage inputted from the inverter 41 are positive or negative. The positive/negative judgment units 437U, 437V and 437W output the code "1" when the input voltage is positive, and output the code "0" when the detected voltage is negative. The determined positive/negative judgment result is inputted to the motor position setting unit 438 connected to the outputs of the positive/negative judgment units 437U, 437V and 437W. The motor position setting unit 438 sets the motor position based on the positive/negative judgment result inputted from the positive/negative judgment units 437U, 437V and 437W. The set motor position is inputted to the motor speed estimation unit 439 connected to the motor position setting unit 438.

The motor position is an estimated phase represented by dividing one cycle of the motor voltage into six divisions, and one section divided into six is an estimated phase represented as the same value. The relationship between the estimated phase and the motor position is shown below.

Motor position=1 for estimated phase 0 to 60°
Motor position=2 for estimated phase 60 to 120°
Motor position=3 for estimated phase 120 to 180°
Motor position=4 for estimated phase 180 to 240°
Motor position=5 for estimated phase 240 to 300°
Motor position=6 for estimated phase 300 to 360°

Figure 3:
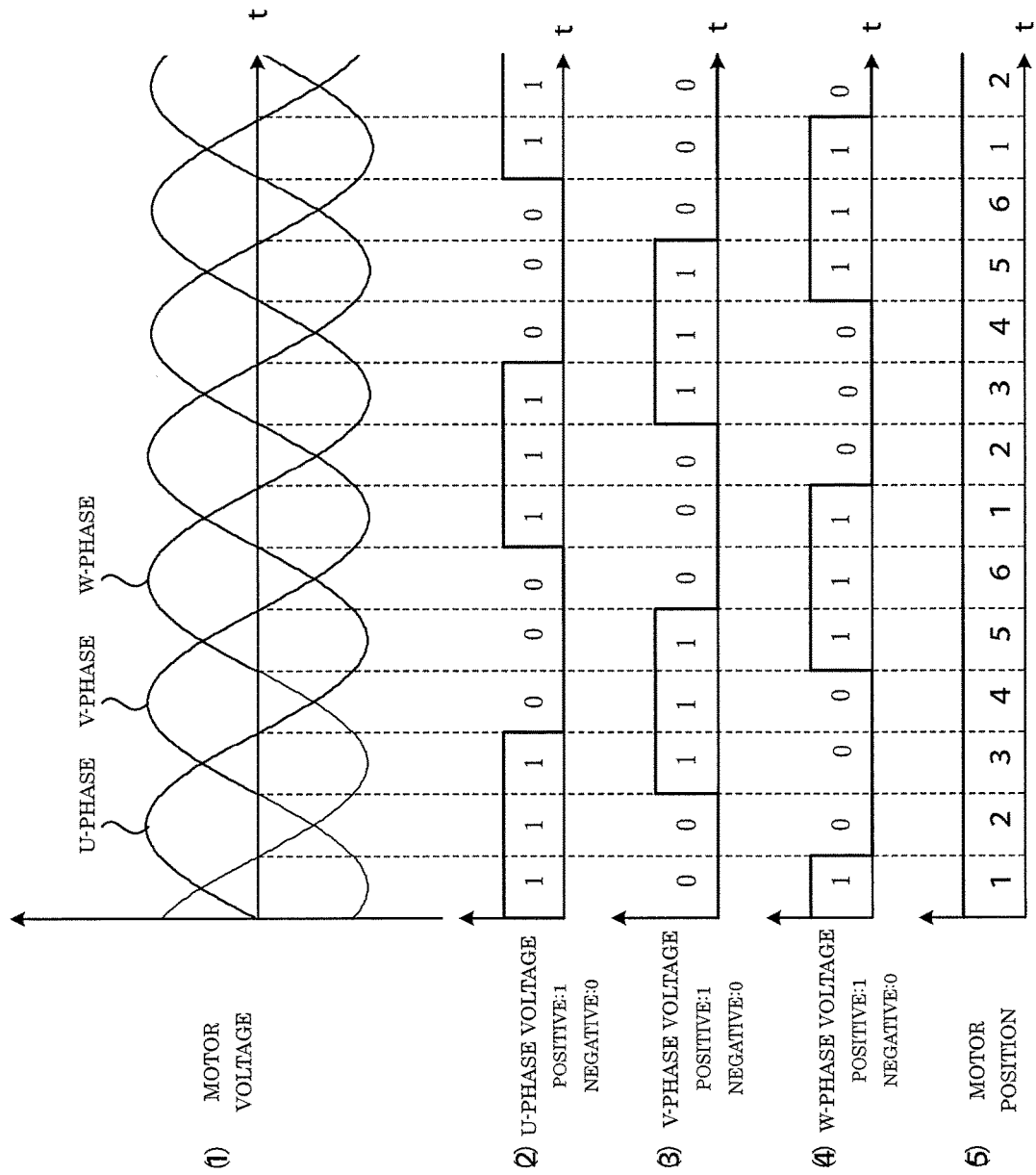
FIG. 3 A view showing a method of estimating a phase based on positive/negative judgment of an induced voltage of the synchronous motor according to the first embodiment.

Next, motor position setting means will be described. FIG. 3 is a diagram showing a method of estimating the motor position based on the positive/negative judgment of the motor voltage according to the first embodiment. FIG. 3 (1) shows motor voltage waveforms of the U phase, the V phase and the W phase. FIG. 3 (2) is a diagram showing positive/negative judgment results which are outputs of U-phase, V-phase and W-phase positive/negative judgment units 437U, 437V and 437W. Since the U-phase, V-phase and W-phase motor voltages are sine waves, periods of positive voltage and periods of negative voltage appear alternately. Therefore, the positive voltage and the negative voltage of the U-phase, V-phase and W-phase motor voltages are determined (hereinafter, they may be referred to as positive/negative determination). In this determination, the horizontal axis is a time axis (phase axis) t based on the U-phase motor voltage. And by setting the vertical axis is "1" with a period when a positive voltage with respect to the time axis t, and "0" with a period when a negative voltage with respect to the time axis t, positive/negative judgment signals of the U-phase, the V-phase and the W-phase shown in FIGS. 3 (2) to 3 (4) are generated.

FIG. 3 (5) shows motor positions 1 to 6. The motor positions 1 to 6 are set by plotting the points where the U-phase, V-phase and W-phase motor voltages respectively cross 0 [V] with reference to the U-phase motor voltage. The motor positions 1 to 6 correspond to positions where the cycle T shown in FIG. 3(1) is shifted in phase by 60° with reference to the U-phase motor voltage. The details will be described below. FIG. 3 (2) shows the output of the U-phase motor voltage positive/negative judgment unit 437U shown in FIG. 2 (1). It outputs "1" during a period indicating a positive voltage, and outputs "0" during a period indicating a negative voltage. FIG. 3 (3) shows the output of the positive/negative judgment unit 437V of the V-phase motor voltage shown in FIG. 2 (1). It outputs "1" during a period indicating a positive voltage, and outputs "0" during a period indicating a negative voltage. FIG. 3 (4) shows the output of the W phase motor voltage positive/negative judgment unit 437W shown in FIG. 2 (1). It outputs "1" during a period indicating a positive voltage, and outputs "0" during a period indicating a negative voltage. The outputs of the U-phase, V-phase, and W-phase motor voltage positive/negative judgment units 437U, 437V, and 437W are inputted to the motor position setting unit 438. The motor position setting unit 438 sets the motor position according to the table shown in Table 1.

The set motor position, which is the output of the motor position setting unit 438, is inputted to the motor speed estimation unit 439. Next, the operation of the motor speed estimation unit 439 will be described. The motor speed estimation unit 439 calculates a change per time with respect to the inputted motor position (ie, the estimated phase). First, the change of the motor position change number ΔPOS is integrated in a calculation period by a predetermined number of additions N times (here, described as N times). The calculation period Δt is a sampling time on calculation of the speed estimation unit 439, and is an arbitrary value sufficiently shorter than a ⅙ period (60°) of the motor voltage.

Further, the change number ΔPOS is a change amount of the motor position shown in FIG. 3(5). If there is no change in the motor position between the samplings of the calculation, the change number ΔPOS=0. The change from motor position 1 to motor position 2 is the change number ΔPOS=+1, and the change from motor position 2 to motor position 3 is also the change number ΔPOS=+1. As described above, the change which the motor position increases sequentially, makes the change number ΔPOS positive. Conversely, the change from motor position 3 to motor position 2 is the change number ΔPOS=−1, and the change from motor position 2 to 1 is also the change number ΔPOS=−1. Thus, the change which the motor position reduces sequentially, makes change number ΔPOS negative.

However, a change in position that straddles motor positions 1 and 6 is calculated as a continuous change. For example, the change from motor position 6 to 1 is the change number ΔPOS=+1, and the change from motor position 1 to 6 is the change number ΔPOS=−1. The relationship between the change in motor position and the number of changes ΔPOS, including the other cases, is shown in Table 2.

The estimated speed is represented by Formula (1), when integration is performed N times, where the nth calculation cycle is Δtn and the motor position is the change number ΔPOSn.

$$f = \frac{\sum_{i=1}^{N} \Delta POSn}{\sum_{i=1}^{N} \Delta tn} \times \frac{1}{6} \quad (1)$$

(Unit: Hz)

The product of the calculation cycle Δt and the number of integrations N is sufficiently longer than one electrical cycle of the motor. Further, the estimated speed is expressed by Formula (2) when the calculation cycle Δt is always constant.

$$f = \frac{\sum_{i=1}^{N} \Delta POSn}{N \times \Delta t} \times \frac{1}{6} \quad (2)$$

(Unit: Hz)

The value represented by Formula (1) or Formula (2) is inputted to the integrator 433b as the output of the speed estimation unit 439 (that is, estimated speed A). It is possible to continuously estimate the motor speed by sequentially updating Δtn and ΔPOSn when i=n to the newly calculated result for each operation cycle. That is, the calculated moving average enables speed estimation.

Figure 4:
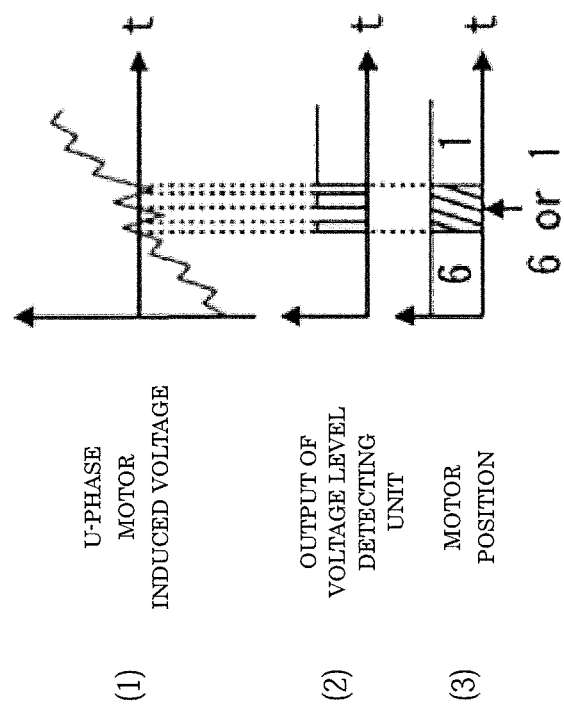
FIG. 4 A diagram showing the behavior near the zero crossing of the induced voltage of the synchronous motor according to the first embodiment.

FIG. 4 is a diagram showing the behavior near the zero cross of the motor voltage according to the first embodiment. FIG. 4 (1) is a diagram showing the behavior near the zero cross of the U-phase motor voltage. In the illustrated example, the U-phase motor voltage crosses zero (passing 0 [V] from negative voltage to positive voltage) when changing from motor position 6 to 1. FIG. 4 (2) shows the output of the positive/negative judgment unit 437U for the U-phase motor voltage shown in FIG. 4(1). In the illustrated example, when noise is superimposed on the detected U-phase motor voltage, the output of the positive/negative judgment unit 437U repeats the position "1" and the position "0" near the zero cross. That is, so-called chattering may be increased. As a result, in the illustrated example, since the signal when the U-phase motor voltage position is repeated "1" and "0", the motor positions 1 to 6 may not be stable.

In such a case, the integrated value of the motor position change amount ΔPOS can be increased by setting the number of additions N shown in the above equation (1) sufficiently large. As this effect, the influence of the chattering mentioned above can be reduced, and as a result, there is an effect of canceling the chattering. The chattering cancellation of the U-phase motor voltage has been described above, the chattering cancellation of the V-phase motor voltage and the W-phase motor voltage is the same as U-phase.

The estimated speed A calculated above is outputted from the speed estimation unit 439 in FIG. 2, and inputted to the integrator 433b. When substitution command D is inputted to integrator 433b at the time of restart by a restart signal or the like (not shown), the estimated speed is substituted only once for one restart in the integral term of integrator 433b. And only at that time, the estimated speed A is equal to the output C of the integrator 433b. After that, the integrator 433b is operated by setting the output B of the proportional unit 433a to the integrator 433b as an integral input as usual. Since the integral term of PI control can start calculation from the value of estimated speed A by the above processing, it becomes possible to make output C of integrator 433 b equal to actual motor speed more quickly, in the operation of the motor PLL unit 43, and the Q-axis voltage can be made to follow zero and the response of PI control can be improved.

Next, the process flow at restart will be described.

(1) A field current is supplied to the motor 50. In the case of the permanent magnet motor, since the magnetic pole is established from the beginning, it is not necessary to flow the field current, so this procedure can be omitted.

(2) A voltage is induced in the motor 50 (a motor voltage is generated).

(3) The motor position is calculated from the positive voltage and the negative voltage of the motor voltage of each phase.

(4) The number of changes ΔPOS of the motor positions 1 to 6 for N times is calculated, and the estimated speed A is estimated by dividing it by the total integration time (see the motor estimated speed A of the speed estimation unit 439 in FIG. 2).

(5) The substitution command D is inputted to the integrator 433b only once for one restart at the time of activation by an external timing signal or the like (substitution instruction means).

(6) The estimated speed A is substituted for the integral term inside the integrator 433b.

(7) After that, the output B of the proportional unit 433a is used as an integral input of the integrator 433b as usual, and the operation of the integrator 433b is performed.

(8) When the operation of the motor PLL unit 43 becomes static, control of the synchronous motor is started using the calculated motor phase θI.

Figure 5:
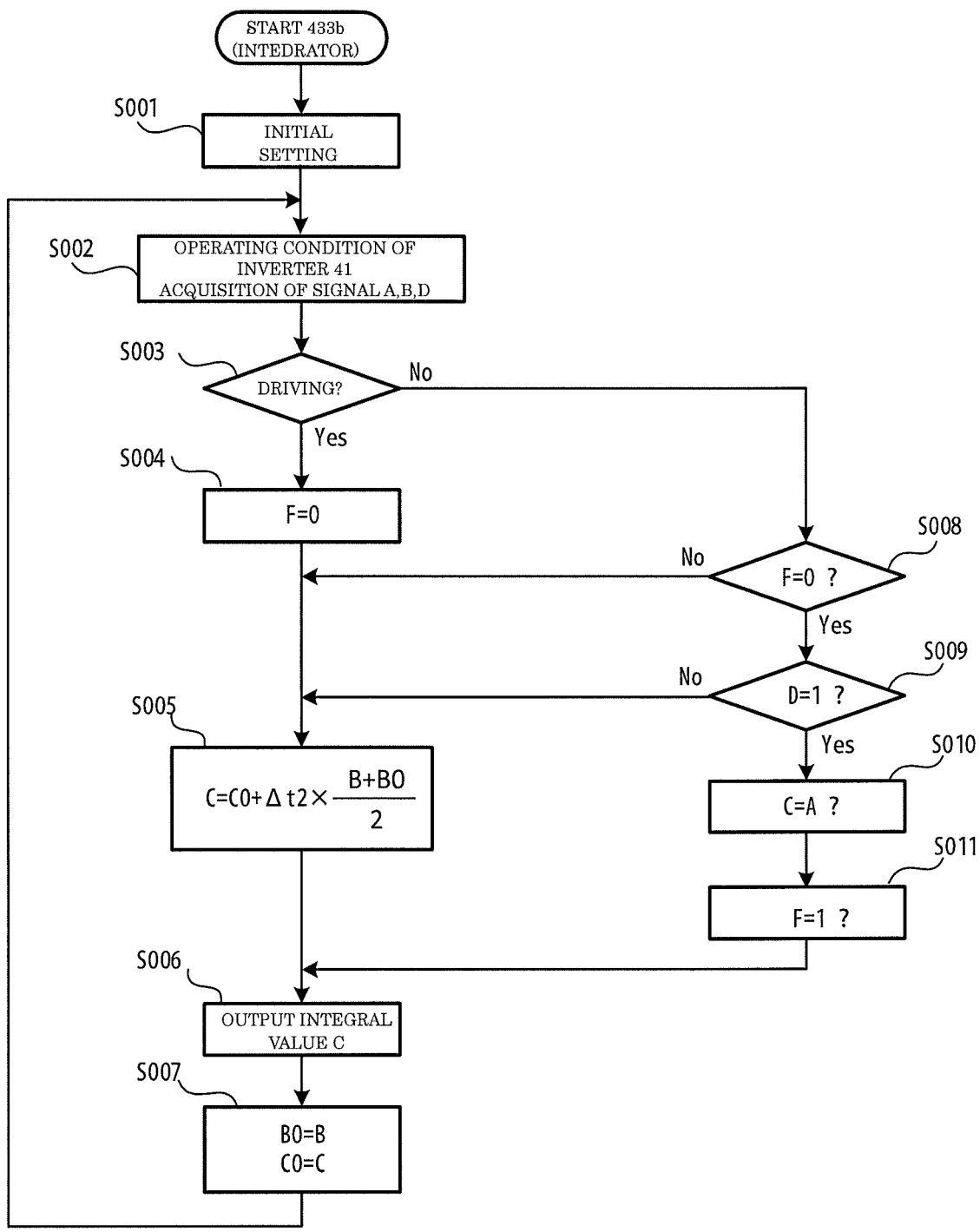
FIG. 5 A flowchart for explaining the operation of the integrator 433*b* according to the first embodiment.

The operation of the integrator 433b according to the first embodiment will be described below with reference to FIG. 5. FIG. 5 is a flowchart showing the operation of the integrator 433b of the present invention when the integrator 433b constitutes a trapezoidal integrator as an example. Here, trapezoidal integration is used as an example of numerical integration, but the integration method need not be limited to trapezoidal integration, and may be implemented by another method. The operation of the integrator 433b will be described below with reference to the flowchart of FIG. 5. In step S001, initial values are set to the values B0, C0, and the flag F as initial settings. The flag F is a flag indicating whether or not substitution of the estimated speed A to the integral value C has been performed. Not assigned at F=0, and assigned at F=1. The values B0 and C0 correspond to the value one cycle before when the integrator 433b used in trapezoidal integration starts the operation.

First, normal inverter operation will be described. In step S002, the driving state of the inverter 41, the estimated speed A which is the output of the speed estimation unit 439, the output value B of the proportional unit 433a, and the substitution command D, are fetched. In step S003, it is determined whether the inverter 41 is in operation, and if it is in operation (Yes at step S003), the process proceeds to step S004. In step S004, since the substitution of the estimated speed A into the integral value C has not been performed yet, the flag F is set to 0. In step S005, trapezoidal integration calculation is performed and the integration value C is calculated by using the value B, the value B0, the value C0, and the calculation cycle Δt2 of the integrator 433b. In step S 006, the integral value C is outputted and it is inputted to the adder 434. In step S 007, the value B0 and C0 indicating the previous value are updated to the output B and integral value C of the proportional unit 433a at the present time. Next, the process returns to step S002.

Next, the case where the inverter 41 is stopped and the motor 50 is idling will be described. In step S002, the operating state of the inverter 41, the estimated speed A which is the output of the speed estimation unit 439, the output value B of the proportional unit 433a, and the substitution command D, are fetched as in the operation of the inverter 41. In step S003, it is determined whether the inverter 41 is in operation, and since it is not in operation (No at step S003), the process proceeds to step S008. In step S008, the flag F is determined. Here, since the flag F is set to 0 at step S004 of the previous step loop S002 to S007 (Yes at step S008), the process proceeds to step S009.

In step S009, it is determined whether there is a substitution command D. If there is no substitution command D in step S009 (No in step S009), the process proceeds to step S005 to perform the same movement as that in the normal operation. If it is determined that there is a signal of substitution command D in step S009 (Yes in step S009), the process proceeds to step S010. In step S010, the integral C is set to the value of the estimated speed A. That is, the estimated speed A is substituted into the integral term. In step S011, the flag F is set to 1 and the process proceeds to step S006.

In step S006, the integral value C is outputted to the adder 434 as the output of the integrator 433b. In step S007, B0 and C0 are replaced with the current B and C, respectively. Next, the process returns to step S002. As described above, while the inverter 41 is in operation, the integrator 433b repeats step S002 to step S007 to integrate the output B of the proportional unit 433a and output the integral value C.

Next, the case where the inverter 41 is stopped and the motor 50 is idling will be described. In step S002, the process proceeds from step 003 to step 008 in the second loop in which the inverter 41 is stopped and the substitution command D is received. Although the determination of the flag F is performed in step 008, since the flag F is not 0, the process does not advance to step 009. The process proceeds from step 008 to step 005.

Thus, the estimated speed A is substituted into the integrator 433b only once at the time of restart. As described above, according to the present invention, it is possible to provide a control apparatus of a synchronous motor that is capable of speed estimation at an arbitrary speed from low speed to high speed area and is capable of restarting.

As described above, while the inverter 41 is in operation, the integrator 433b repeats step S002 to step S007 to integrate the output B of the proportional unit 433a and output the integral value C.

While certain embodiment have been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

DESCRIPTION OF THE SYMBOLS

1 Control apparatus
10 AC power supply
21 Rectifier
22 Current detector
23 ABS unit
24 Adder/subtractor
25 Voltage detector
26 Power supply synchronized PLL unit
27 Rectifier firing angle controller
28 Rectifier gate controller
30 DC reactor
41 Inverter
42 Voltage detector
43 Motor PLL unit
430 Coordinate conversion unit
431 Phase comparison unit
432, 433a, 435 Proportional unit
433b Integrator
434 Adder
436 Integrator
437U, 437V, 437W Positive/negative judgment unit
438 Motor position setting unit
439 Speed estimation unit
44 Inverter firing angle controller
45 Inverter gate controller
46 Speed controller
50 Synchronous motor (motor)
60 Load

The invention claimed is:

1. A control apparatus of a synchronous motor with a load commutated inverter, comprising:
    a positive/negative judgment unit for discriminating positive/negative of motor voltage of each phase of three-phase AC input of the synchronous motor;
    an estimated phase setting unit for calculating and setting the estimated phase of the motor voltage based on the judgment result by the positive/negative judgment unit;
    a speed estimation unit for estimating the speed of the synchronous motor, that integrates the change of the estimated phase by a predetermined number of times, and divides the integrated result by the product of the predetermined number of times and the operation cycle.

2. The control apparatus of a synchronous motor according to the claim 1, further comprising a motor position setting unit including an estimated phase setting unit for calculating and setting the estimated phase, the estimated phase setting unit divides one period of the motor voltage into six sections based on the discrimination result by the positive/negative judgment unit, and one section divided period of the motor voltage is regarded as the same value, and the speed of the synchronous motor is estimated by integrating the change of the estimated phase divided into six by a predetermined number of times and divides the integrated result by the product of the predetermined number of times and an operation cycle.

3. The control apparatus of a synchronous motor according to the claim 1, further comprising a phased lock loop including:

a coordinate conversion unit that converts the motor voltage into two axes of D-axis and Q-axis;

a feedback circuit including a proportional integration circuit;

a phase synchronization circuit that detects the phase and frequency of the motor voltage by the coordinate conversion unit and the feedback circuit;

a substitution command unit that substitutes the output of the speed estimation unit as an integral value calculated inside the proportional integration circuit when the synchronous motor is restarted from the time of idling, and executes a proportional integration operation.

4. The control apparatus of a synchronous motor according to the claim 3, wherein, the substitution command unit substitutes the output of the speed estimation unit only once when the synchronous motor is restarted from the time of idling as an integral value calculated inside the proportional integration circuit.

* * * * *